US012768454B2

(12) United States Patent
Wellington et al.

(10) Patent No.: US 12,768,454 B2
(45) Date of Patent: Oct. 20, 2026

(54) AUTOMATIC LOCKING RESILIENT KNIFE GATE VALVE SEAT

(71) Applicant: Bray International, Inc., Houston, TX (US)

(72) Inventors: Rajan Wellington, Chennai (IN); Amitartha Sahoo, Balasore (IN); Ramakrishnan Viswanathan, Chennai (IN)

(73) Assignee: Bray International, Inc., Houston, TX (US)

( * ) Notice: Subject to any disclaimer, the term of this patent is extended or adjusted under 35 U.S.C. 154(b) by 21 days.

(21) Appl. No.: 18/796,681

(22) Filed: Aug. 7, 2024

(65) Prior Publication Data

US 2025/0052327 A1 Feb. 13, 2025

Related U.S. Application Data

(60) Provisional application No. 63/518,399, filed on Aug. 9, 2023.

(51) Int. Cl.
*F16K 3/02* (2006.01)
*F16K 27/04* (2006.01)

(52) U.S. Cl.
CPC .......... *F16K 3/0281* (2013.01); *F16K 3/0227* (2013.01); *F16K 27/044* (2013.01)

(58) Field of Classification Search
CPC ..... F16K 3/0281; F16K 3/0227; F16K 27/044
USPC .......................................................... 251/328
See application file for complete search history.

(56) References Cited

U.S. PATENT DOCUMENTS 2,857,129 A * 10/1958 Overholser ........... F16K 3/0227 251/328
3,765,440 A * 10/1973 Grove ................... F16K 3/0227 137/246.22
3,765,647 A * 10/1973 Grove ................... F16K 3/0227 251/328
4,067,542 A * 1/1978 Morrison .............. F16K 3/0227 251/328
4,429,710 A * 2/1984 Grieves ...................... F16K 3/02 251/285

(Continued)

FOREIGN PATENT DOCUMENTS

EP 2527694 B1 10/2013

OTHER PUBLICATIONS

Schumacher, G, PCT International Search Report & Written Opinion for PCT/US2024/041200, Dec. 4, 2024, 10 pages, European Patent Office, Rijswijk, the Netherlands.

*Primary Examiner* — John Bastianelli
(74) *Attorney, Agent, or Firm* — Oathout Law Firm; Laura Tu; Mark A. Oathout

(57) ABSTRACT

A knife gate valve includes a valve body defining a bore along a bore axis for media flow and a gate for the bore. The valve body has an interior surface with an annular groove formed entirely therein. The annular groove includes a stepped surface and a first locking surface adjacent and contiguous to the stepped surface. A resilient seat ring is inserted within the annular groove and includes a wedge having a sloped surface, the wedge being installed past the stepped surface. The resilient seat ring further includes a second locking surface adjacent and contiguous to the sloped surface. The first and second locking surfaces are configured to abut.

4 Claims, 13 Drawing Sheets

(56) References Cited

U.S. PATENT DOCUMENTS

| | | | | | |
|---|---|---|---|---|---|
| 4,519,583 | A * | 5/1985 | Lapinoja | F16K 1/425 | 251/360 |
| 4,603,864 | A | 8/1986 | Raftis | | |
| 5,013,009 | A * | 5/1991 | Nelson | F16K 3/12 | 251/328 |
| 5,014,730 | A * | 5/1991 | Fye | F16K 3/0227 | 137/454.2 |
| 5,890,700 | A | 4/1999 | Clarkson et al. | | |
| 6,328,316 | B1 * | 12/2001 | Fukuhara | F16J 15/062 | 277/910 |
| 6,523,833 | B1 * | 2/2003 | Ishigaki | F16J 15/062 | 277/551 |
| 6,957,816 | B2 | 10/2005 | Blease et al. | | |
| 7,306,237 | B2 * | 12/2007 | Tsuji | F16J 15/062 | 277/644 |
| 7,815,170 | B2 | 10/2010 | Devine et al. | | |
| 8,016,265 | B2 | 9/2011 | Weide | | |
| 8,056,882 | B2 | 11/2011 | Ohlson et al. | | |
| 8,220,778 | B2 | 7/2012 | Langmesser et al. | | |
| 8,251,086 | B2 | 8/2012 | Ellis et al. | | |
| 8,408,519 | B2 | 4/2013 | Ohlson et al. | | |
| 2010/0264350 | A1 | 10/2010 | Langmesser et al. | | |

* cited by examiner

AUTOMATIC LOCKING RESILIENT KNIFE GATE VALVE SEAT

BACKGROUND

Technical field: The subject matter generally relates to resilient face seating apparatuses and techniques for knife gate valves.

Conventional knife gate valves are often used to control the flow of slurries, paper and pulp transported through tubular conduits. There are generally two variants of knife gate valves (hereinafter, also "KGVs") with regards to flow direction, that is uni-directional and bi-directional knife gate valves. In these variants, the seat design could be metal seated or resilient seated. In conventional resilient seated KGVs, the resilient seat may either be an elastomeric or a plastic material and may seal against the face or periphery of the gate. With conventional elastomeric seats, there is a temperature constraint when using materials such as nitrile, ethylene propylene diene monomer (EPDM), or fluoroelastomers (FKM). Thus, for valves rated to 200 degrees Celsius (or 392 degrees Fahrenheit) or higher, plastic seats are used instead, such as, and not to be limited to: polytetrafluoroethylene (PTFE), reinforced polytetrafluoroethylene (RPTFE), or polyetheretherketone (PEEK), etc.

Conventional plastic seats for knife gate valves include the following: a molded plastic seat as retained by a pin which is welded to the valve body; molded plastic seat on a stainless steel insert, wherein the stainless steel insert is retained by a pin; a molded plastic seat having a letter "D" shaped profile and as retained by a retainer ring; a molded plastic seat as retained by a screw; and a crimped plastic seat. However, these prior-known resilient seats have many disadvantages. These include that certain conventional molded plastic seats are not positively secured, in particular when the gate is fully open. Machining is often costly as the known retainers and seats may require several steps of machining, including additional crimping, compressing, welding, and the inclusion of additional components such as pins, screws, O-rings and the like. The assembly may be difficult (such as through the top or gland entry), and is difficult to replace. For example, any welding of the seat overcomplicates replacement, and often replacement kits require multiple components as part of a seat assembly (which may include by way of example, the ring, a retaining ring, multiple fasteners, O-rings, and the like). Further, certain prior-known molded plastic seats may move out of the position, even when retained by a pin in the valve body or other retaining means, rendering the molded plastic seat unsuitable for reverse pressure or horizontal orientations. Additionally, conventional molded plastic seat design as backed by O-rings have an inherent temperature limitation of 150 degrees Celsius (or 302 degrees Fahrenheit) or less.

Accordingly, a need exists for an improved resilient seat for a knife gate valve which can be positively secured without additional retaining devices, mechanisms, fasteners, rings or screws; automatically locks or self-locks into the valve body or metal seat upon insertion without a need for additional retaining devices or mechanisms; is capable for use in reverse pressure and use in bi-directional valves; is capable for use in orientations other than the standard vertical orientation; and can be adapted for integral or separate seating.

BRIEF SUMMARY

The embodiments disclosed herein relate to a knife gate valve having a valve body which defines a bore, and a gate for the bore, and having: an interior surface of the valve body; an annular groove defined entirely within the interior surface; a stepped surface and a first locking surface defined in and of the annular groove, wherein the first locking surface is adjacent and contiguous to the stepped surface; a resilient seat ring inserted into the annular groove, wherein the resilient seat ring has a wedge defining a sloped surface, and wherein the wedge is installed past the stepped surface of the annular groove; a second locking surface defined on the resilient seat, wherein the second locking surface is adjacent and contiguous to the sloped surface; and further wherein the first locking surface and second locking surface are configured to abut.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this disclosure, and are not to be considered limiting of its scope, for the disclosure may admit to other equally effective embodiments. The figures are not necessarily to scale and certain features and certain views of the figures may be shown exaggerated in scale or in schematic in the interest of clarity and conciseness.

DETAILED DESCRIPTION OF THE EMBODIMENT(S) SHOWN

The description that follows includes exemplary apparatus, methods, techniques, and instruction sequences that embody techniques of the inventive subject matter. However, it is understood that the described embodiments may be practiced without these specific details.

Figure 1:
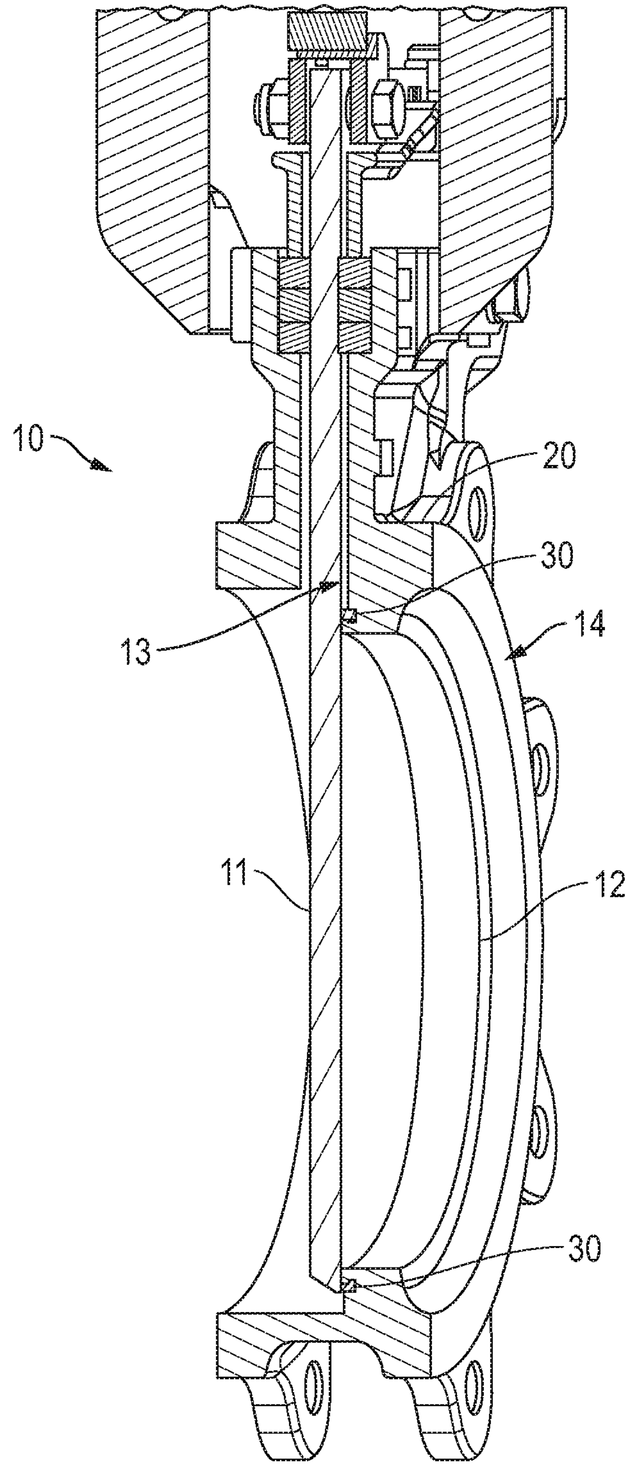
FIG. 1 depicts a front isometric cross section view of an exemplary embodiment of a knife gate valve with resilient seat.
Figure 2:
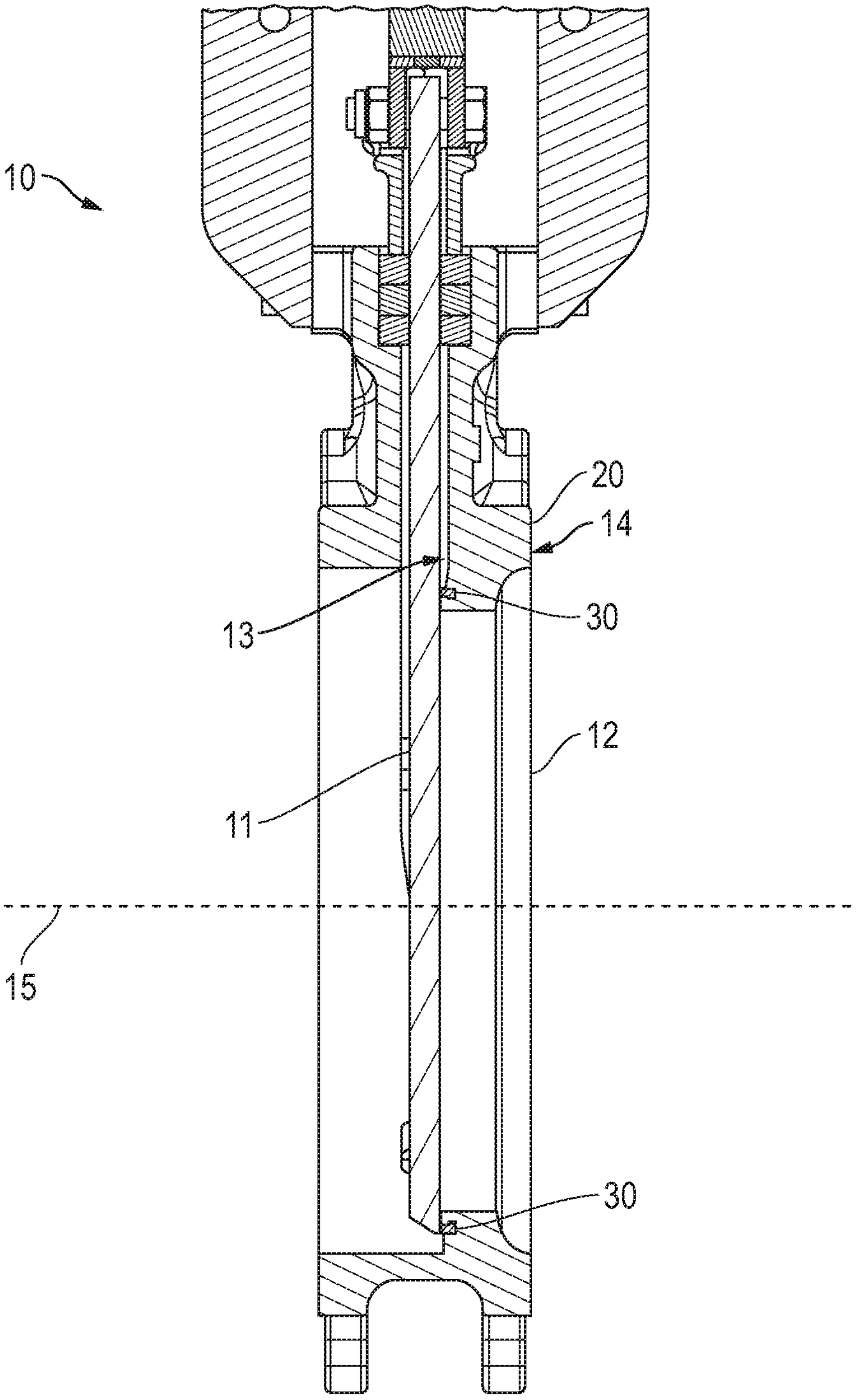
FIG. 2 depicts a side cross section view of an exemplary embodiment of a knife gate valve with resilient seat.

FIG. 1 depicts a front isometric cross section view of an exemplary embodiment of a knife gate valve 10 for uni-directional media flow with a plastic, resilient or flexible seat, ring, or seat ring 30, and FIG. 2 depicts a side cross section view of same. The face seating knife gate valve 10 includes a valve body 20 which defines a bore 12 through which a valve media may flow through when the valve 10 is in an open or any partial open or partial closed positions. The valve body 20 may optionally include a metal or replaceable seat 21, wherein the metal seat 21 is fastened or otherwise secured to the valve body 20 and can be replaced. The bore 12 may be a substantially cylindrical surface or opening which connects an interior surface or face 13 and an exterior surface 14 of the valve body 20; further the bore 12 may be a cylindrical surface or opening which is extended a radial distance about a bore axis 15 along which the media may flow. When the valve 10 is in a fully closed position, a gate or obturator 11 obscures or blocks the entirety of the bore opening 12 via descending through the valve body 20 at a transverse or perpendicular plane to the bore 12 or bore axis 15. When the valve 10 is in a fully open position, the gate 11 is retracted above the valve body 20 and the bore 12 is unobstructed. The gate 11 may also partially cover the bore 12 in partially opened or transitional positions of the knife gate valve 10. An actuator (not illustrated) or operator may actuate the gate 11 between the opened and closed positions of the valve 10.

Figure 4:
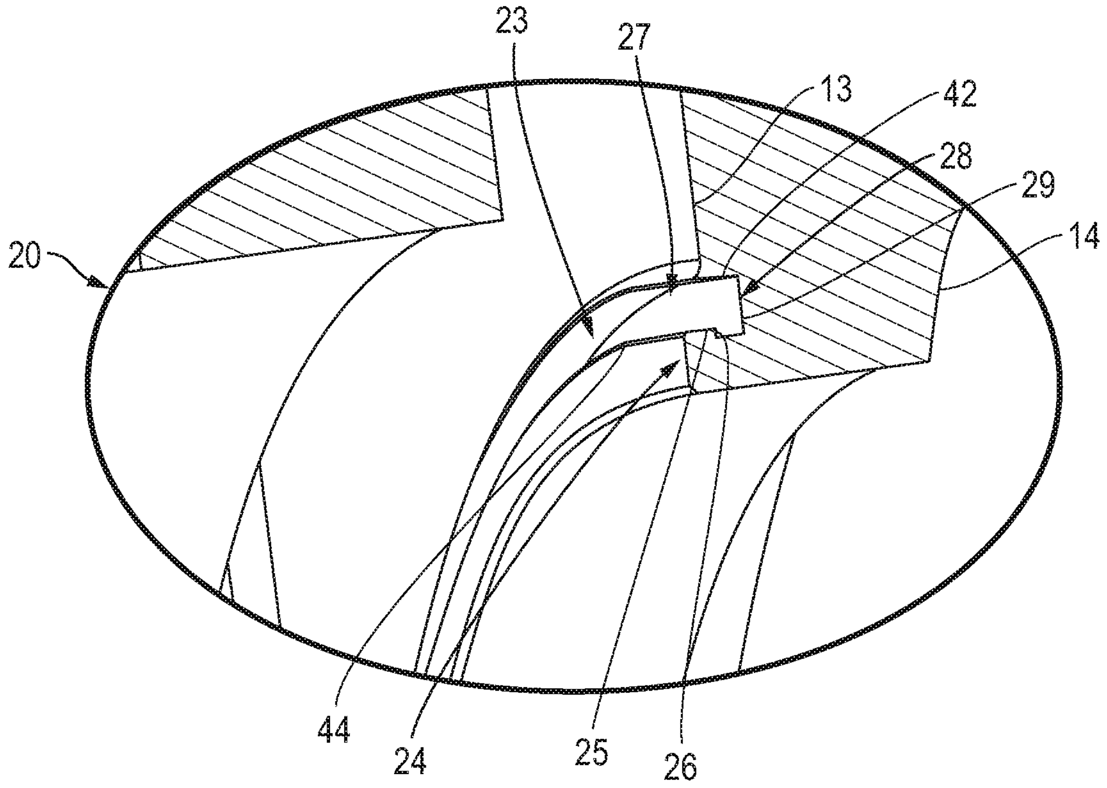
FIG. 4 depicts an enlarged partial isometric cross section view of an exemplary embodiment of a valve body of a knife gate valve.
Figure 6:
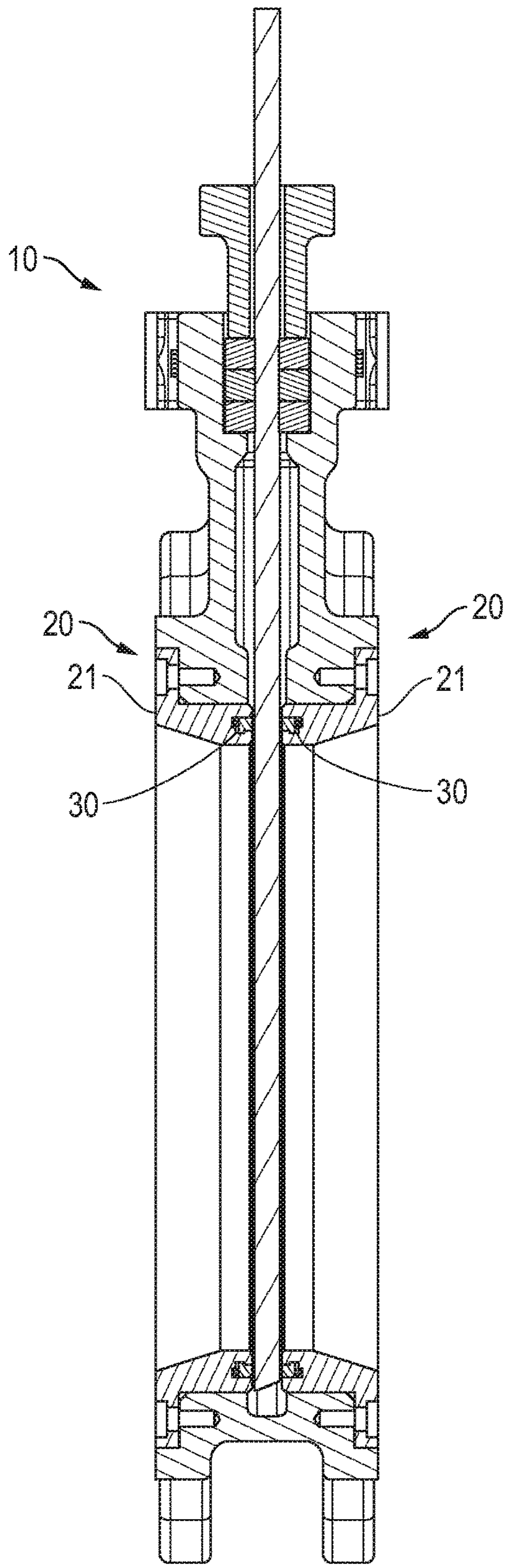
FIG. 6 depicts a side cross section view of an alternative exemplary embodiment of a bidirectional knife gate valve with two resilient seats.
Figure 7:
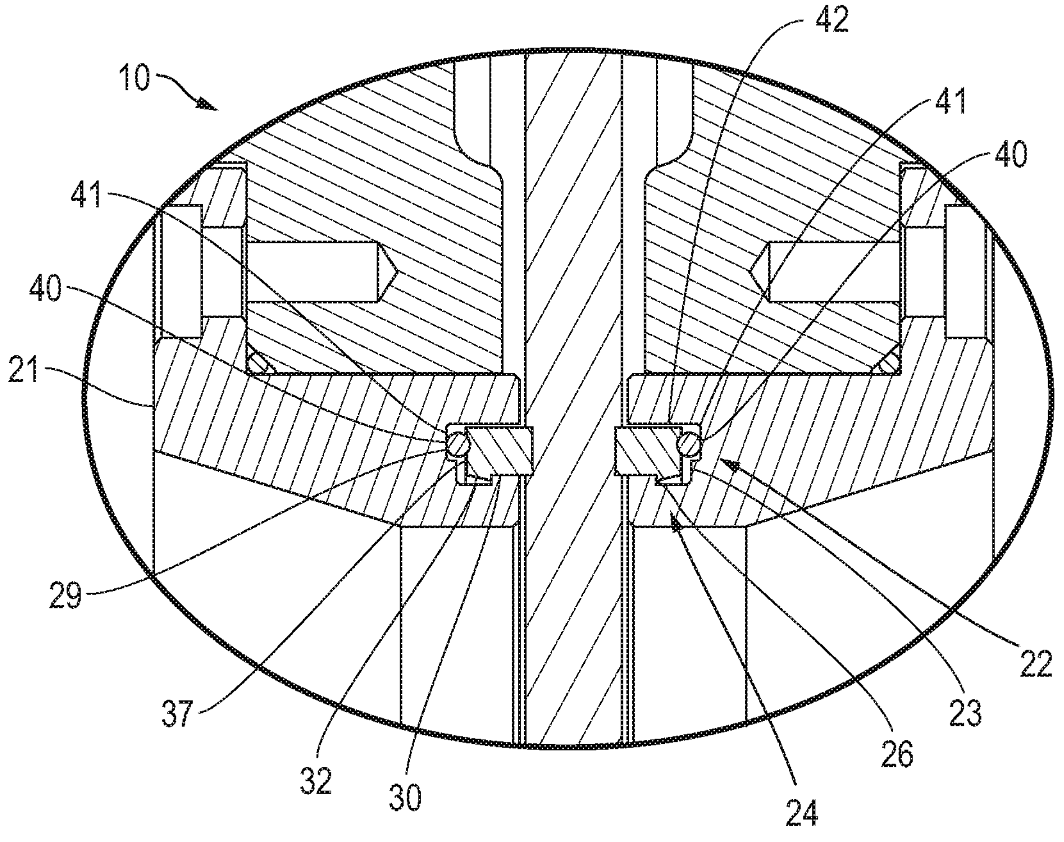
FIG. 7 depicts an enlarged partial side cross section view of the alternative exemplary embodiment of a knife gate valve with two resilient seats in FIG. 6.
Figure 8:
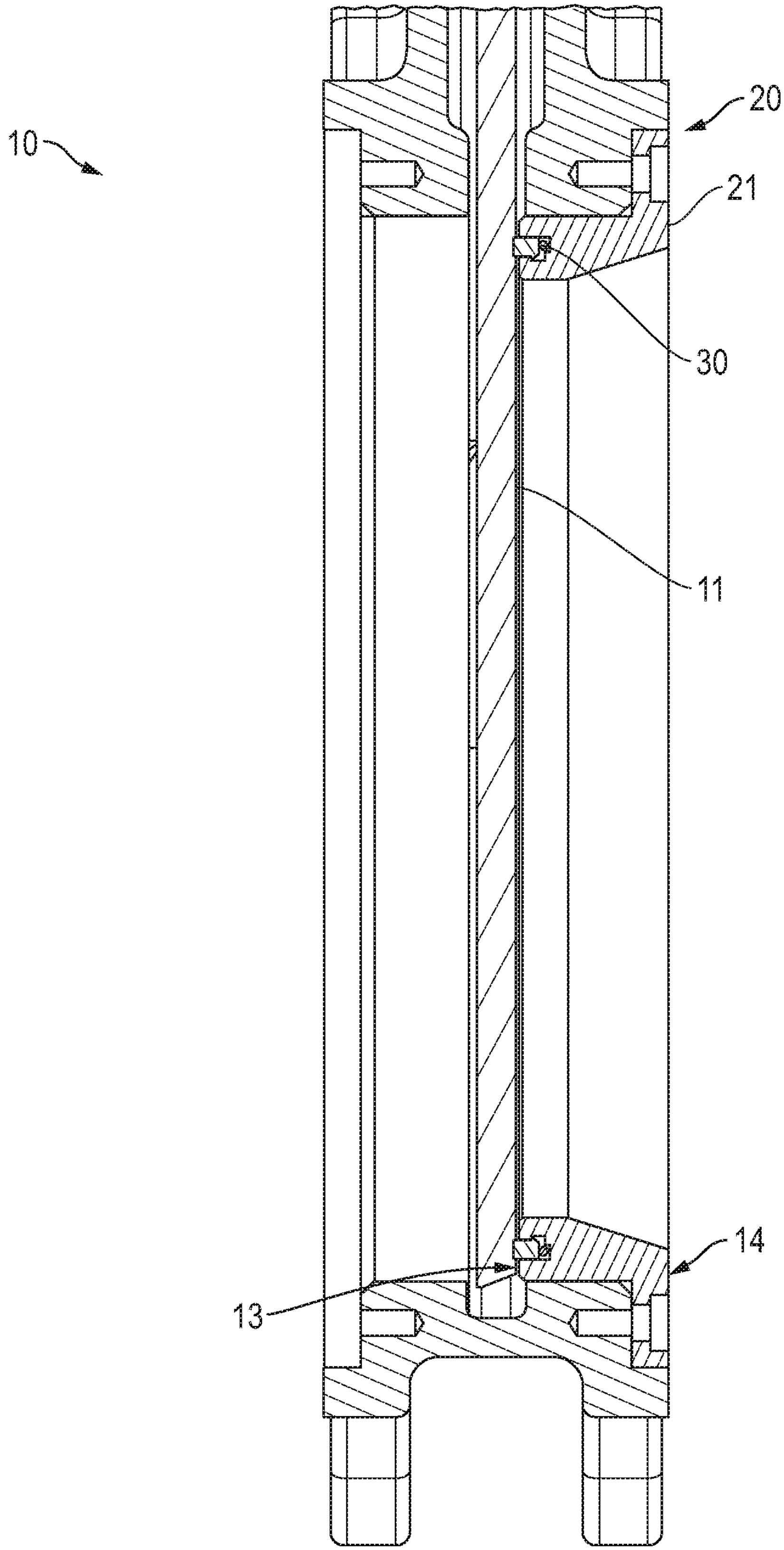
FIG. 8 depicts a side cross section view of an alternative exemplary embodiment of a unidirectional knife gate valve with a resilient seat.
Figure 9:
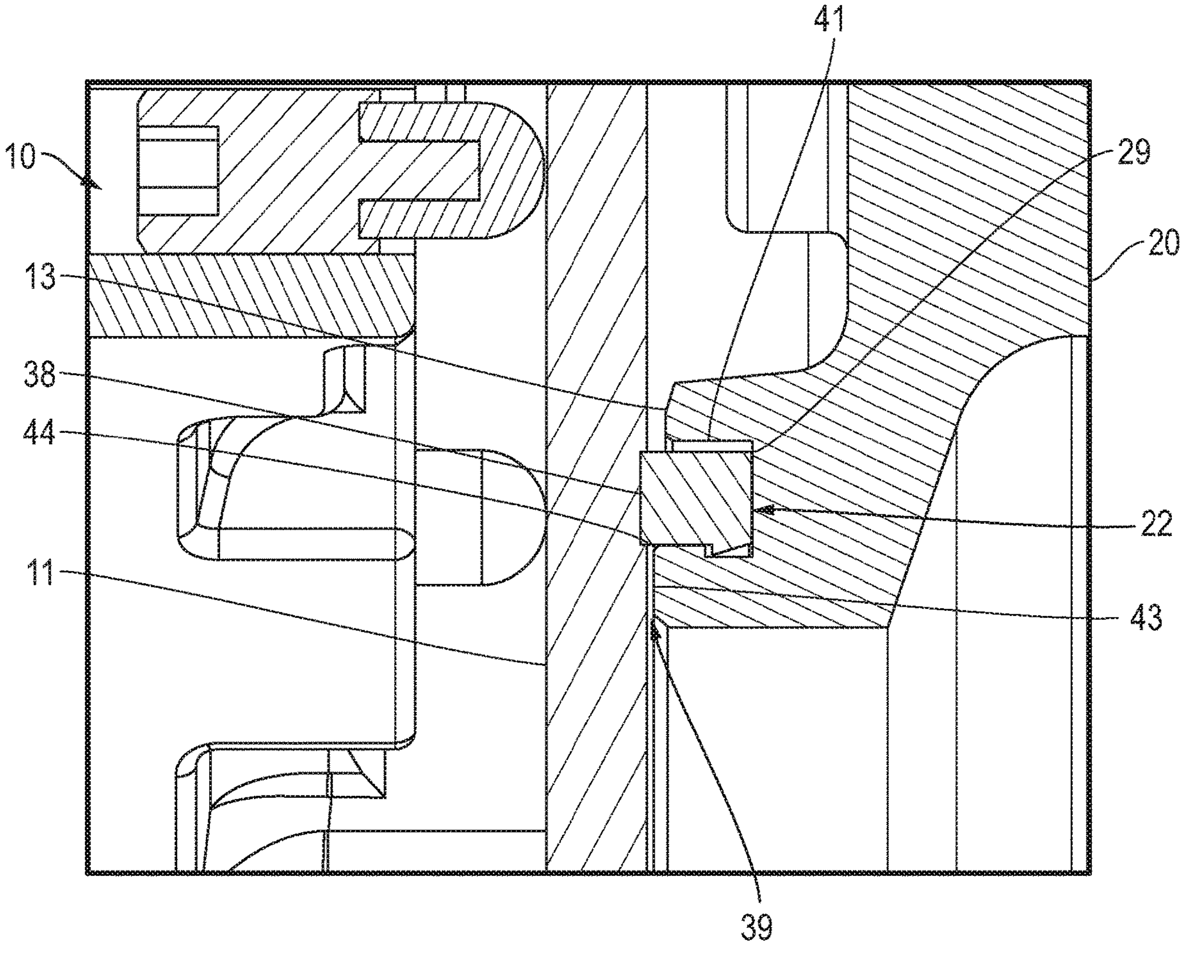
FIG. 9 depicts an enlarged partial side cross section view of an exemplary embodiment of a knife gate valve with a resilient seat.
Figure 10:
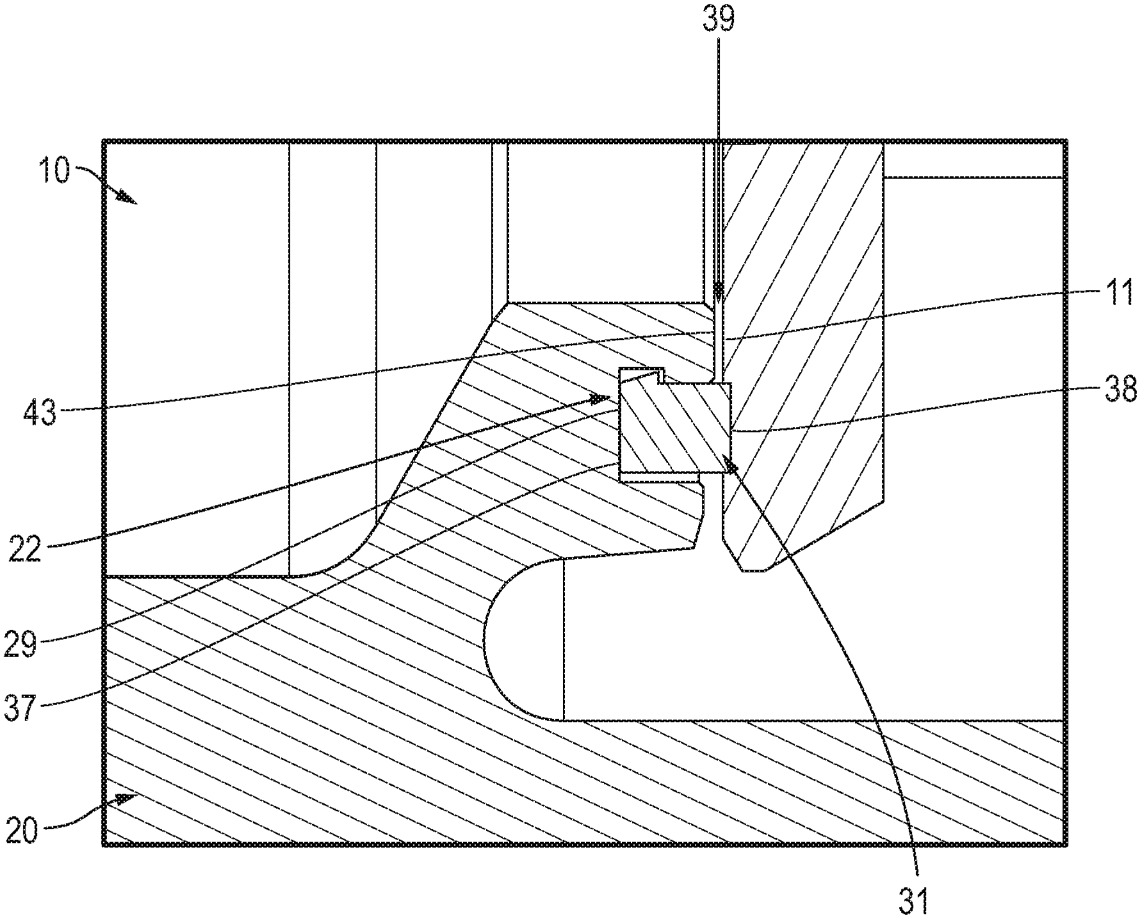
FIG. 10 depicts an enlarged partial side cross section view of an exemplary embodiment of a knife gate valve with a resilient seat.
Figure 11:
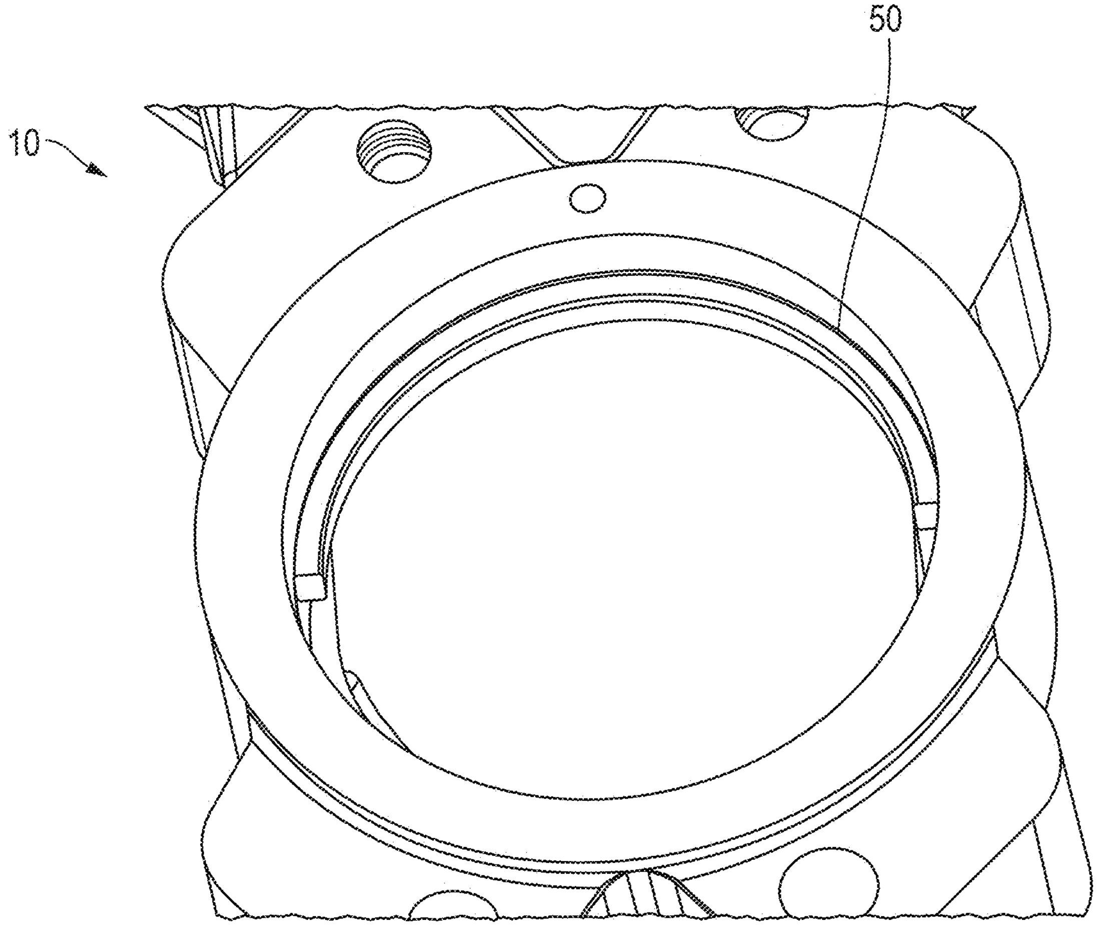
FIG. 11 depicts a seat opposite side view of an exemplary embodiment of a knife gate valve with a backing ring.
Figure 12:
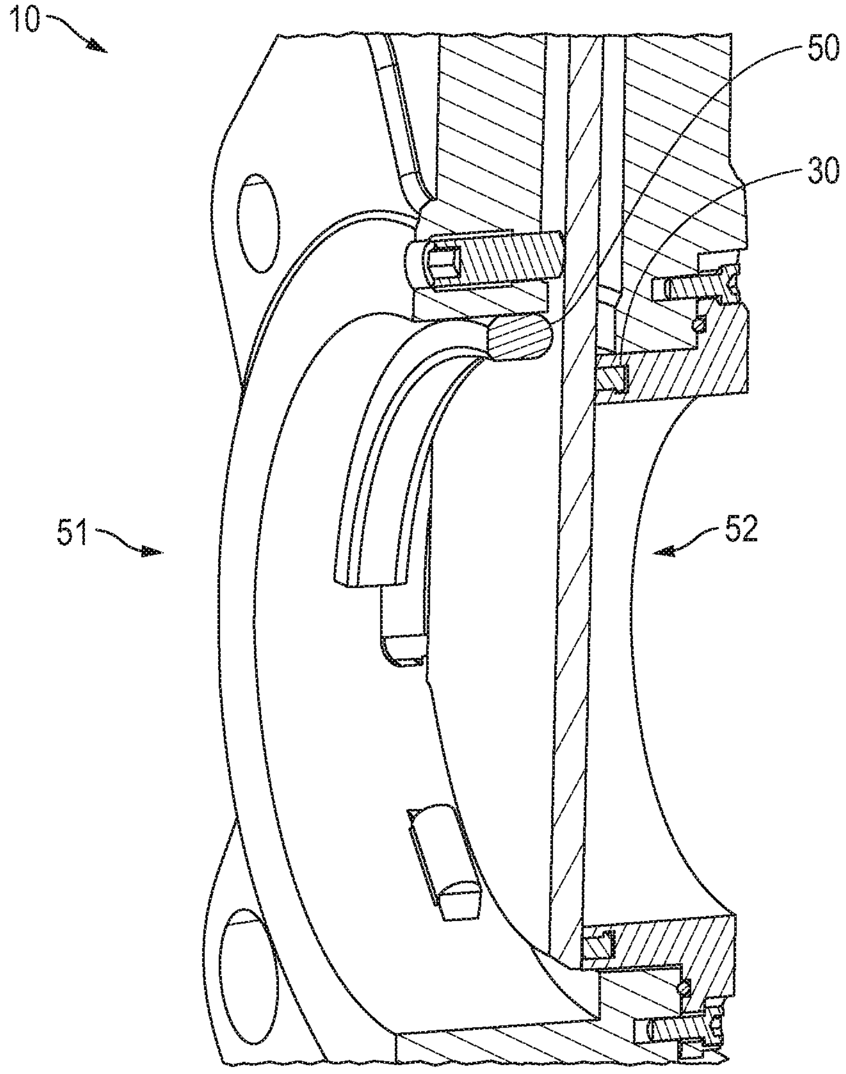
FIG. 12 depicts a partial side cross section view of an exemplary embodiment of a knife gate valve with a backing ring.
Figure 13:
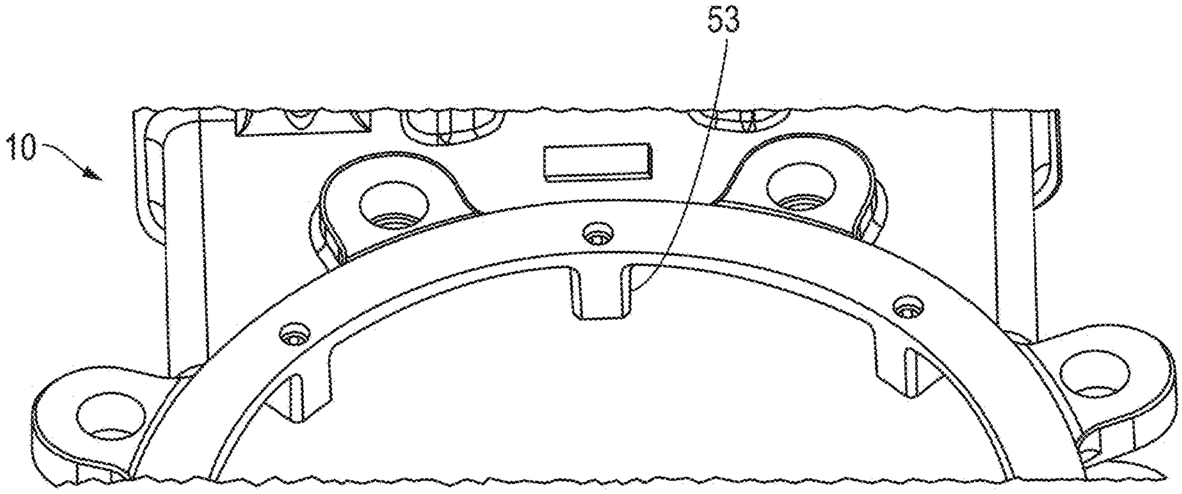
FIG. 13 depicts a seat opposite side view of an exemplary embodiment of a knife gate valve with a gate guide or flange button.
Figure 14:
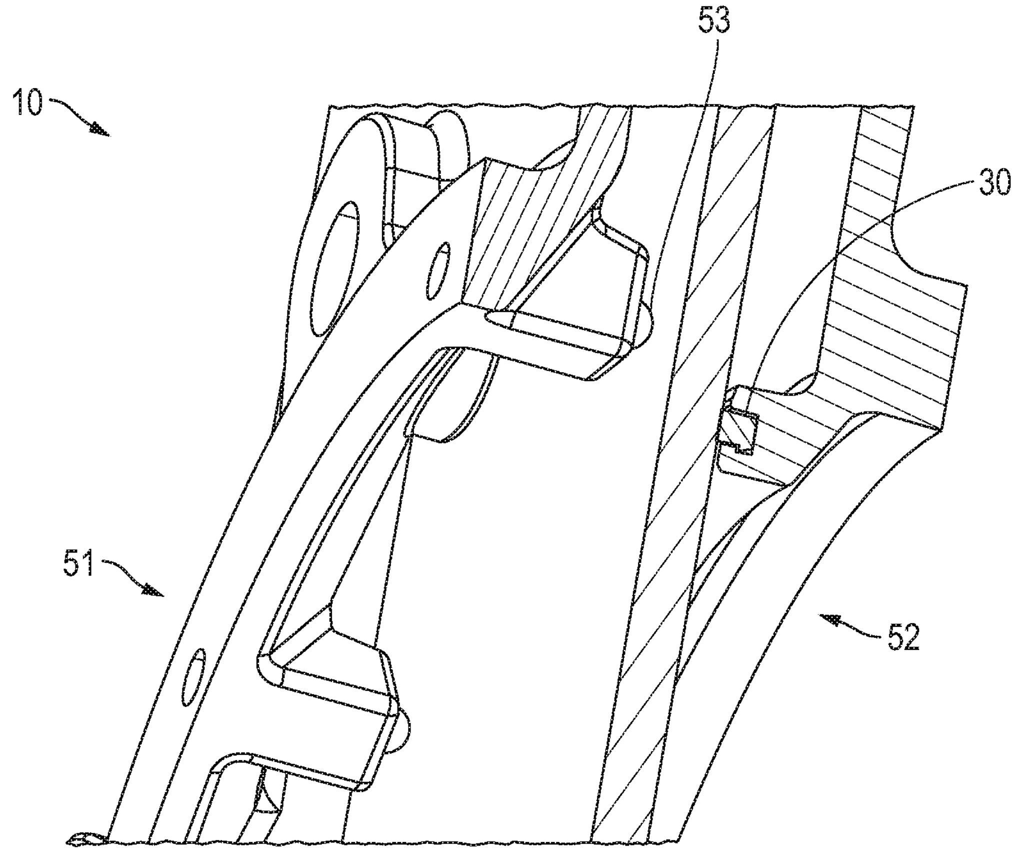
FIG. 14 depicts a partial side cross section view of an exemplary embodiment of a knife gate valve with a gate guide or flange button.

The interior surface 13 of the valve body 20 faces parallel to the gate 11 at all times and inscribed with or defines an annular groove or slot 23, as can be seen in the enlarged isometric cross section view of FIG. 4. In certain exemplary embodiments, such as for the knife gate valves 10 as configured for uni-directional media flow as depicted in FIGS. 4, 9 and 10, the annular groove or slot 23, may have a cross section profile 22, defining a stepped shaped or capital "L" shaped profile, configured to engage with the flexible seat 30. In alternative exemplary embodiments, such as shown in FIGS. 6-7 for a knife gate valve 10 as configured for or capable of bi-directional media flow, the profile 22 may further define an additional annular pocket or compartment 41 for an O-ring 40. In the embodiments described herein, the groove or slot 23 is defined entirely within a singular piece or component of the knife gate valve 10—this may be within the valve body 20 (see e.g., FIGS. 1-2, 4, 9 and 10) or optionally a metal seat 21 secured to and as part of the valve body 20 (see, e.g. FIGS. 6-8), but may also be entirely defined within another component of the knife gate valve 10. Notedly, the annular groove or slot 23 is formed integral to the body 20, or integral to a seat 21 as part of the valve body 20, but the groove or slot 23 is not formed or defined via multiple or two or more pieces or components, and the groove 23 is not formed between a valve body 20 and a seat 21.

The cross section profile 22 of the groove 23 has at least three connected, unitary, contiguous surfaces, including: the stepped surface 24, the outermost groove surface 42, and the rear groove surface 29 which joins the stepped surface 24 and the outermost groove surface 42. The cross section profile 22 may optionally further include a beveled surface 44 defined along the stepped surface 24, at the opening of the groove 23, connecting the valve body's seat surface 43 (or interior surface 13) and stepped surface 24 of the groove 23. The stepped surface 24 is radially nearest to the bore axis 15 and includes a top step surface 25 which is a section of flat or planar surface that is raised, extended, or protruded into the groove 23 and profile 22. The stepped surface 24 further includes an interior locking surface 26 which is contiguous and rises to the top step surface 25. The top step surface 25 is perpendicular to the interior locking surface 26, and preferably does not have any angle or slope. The outermost groove surface 42 is the farthest surface away, radially, from the bore axis 15 (of surfaces 24, 29 and 42 of the annular groove 23) and is located across or opposite from the stepped surface 24.

A first end or area 27 of the annular groove or slot 23 may be directly adjacent or abutting the opening towards the interior surface 13 of the valve body 20 (or metal seat 21, as part of the body 20), and is further adjacent to the top step surface 25. A second end 28 of the annular groove or slot 23 includes the stepped down portion of the groove 23 and is adjacent to the rear groove surface 42. The first end area 27 may be narrower than the second end 28, as determined via a radial distance from the bore axis 15, due to the stepped top surface 25 in the first end area 27; the second end area 28 is wider as it includes the stepped down portion of the groove 23.

Figure 3:
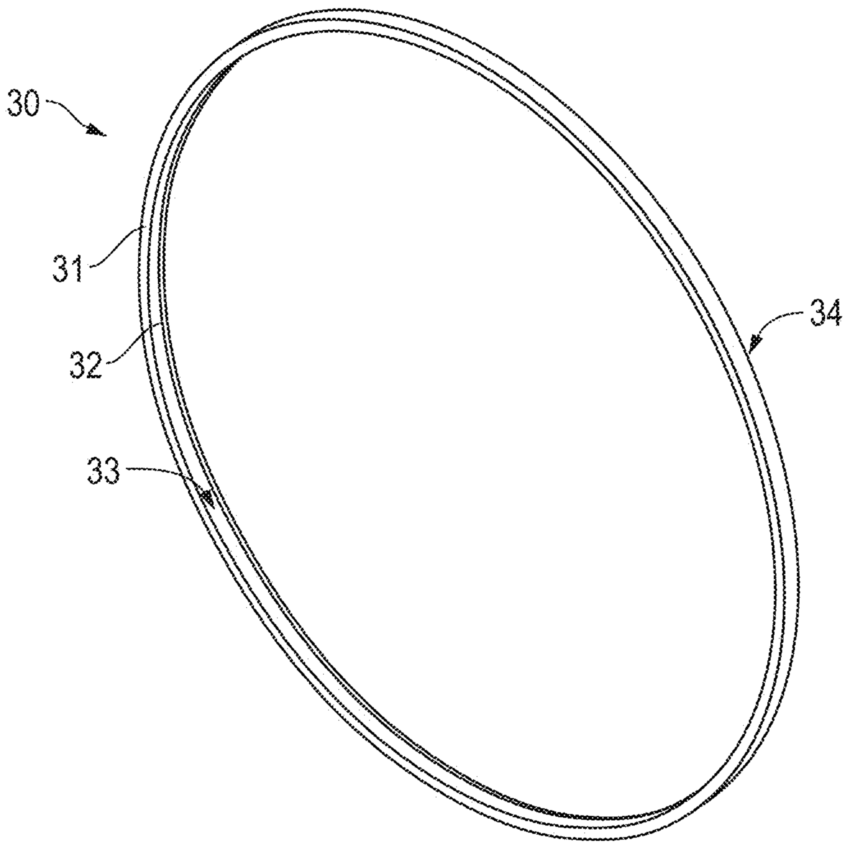
FIG. 3 depicts an isometric view of an exemplary embodiment of a resilient seat for a knife gate valve.
Figure 5:
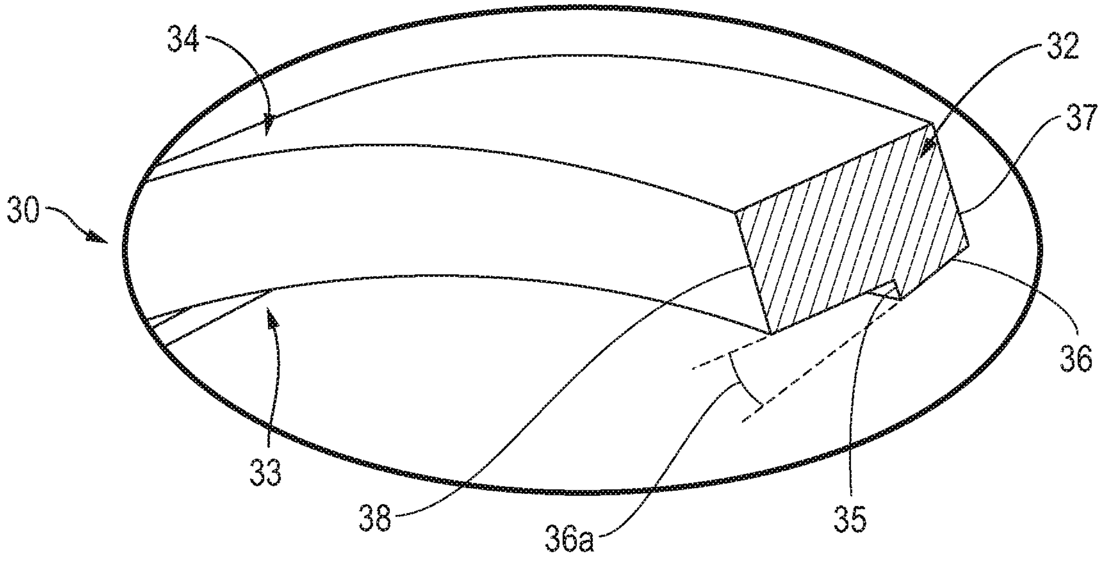
FIG. 5 depicts an enlarged partial isometric cross section view of an exemplary embodiment of a resilient seat for a knife gate valve.

FIG. 3 depicts an isometric view of an exemplary embodiment of a resilient seat 30 for a knife gate valve 10 and FIG. 5 depicts an enlarged partial isometric cross section view of an exemplary embodiment of a resilient seat 30 for a knife gate valve 10. In certain exemplary embodiments, the seat 30 may be composed of a plastic material, although other flexible or resilient materials are encompassed by this disclosure as known to one of ordinary skill in the art. The resilient or flexible seat, ring, or seat ring 30 includes a flexible seat body 31 and a wedge 32 which has an angled or sloped surface 36 jutting out, extending, or protruding from the body 31. The flexible seat ring 30 includes or defines an interior surface 33 (along which the wedge 32 is located); an exterior surface 34; a first end 37 which joins the exterior surface 34 and the sloped/angled surface 36; and a second end 38 opposite the first end 37, which joins the interior surface 33 of the flexible seat 30 and the exterior surface 34 of the flexible seat 30 and further engages the gate 11 when assembled. The sloped surface 36 of the wedge 32 is set at an angle or entry angle 36*a* preferably between 10 to 15 degrees from an axis parallel to the bore axis 15. The sloped surface 36 is further connected or adjacent to a locking surface 35. The locking surface 35 is also defined on the interior surface 33 of the flexible seat 30. The surfaces of the ring 30, including the interior surface 33, exterior surface 34, first end 37, second 38, sloped surface 36 and locking surface 35, when viewed in cross section may appear to be composed of straight or flat surfaces. The flexible, plastic, or resilient seat 30, including the seat body 31 and wedge 32, may be constructed of a unitary, integral, single or one piece component.

During installation of the flexible or resilient seat ring 30, initially the first end 37 of the wedge 32 is inserted towards the interior face 13, and into the first end 27 of the annular groove 23. The particular angle 36*a* and sloped surface 36 of the wedge 32 enables smooth and efficient installation of wedge 32 of the ring 30 over the stepped top surface 25 and into the second end or stepped down portion 28 of the groove 23. The optional beveled surface 44 of the groove 23 may aid in enabling the quick entry of the wedge 32 into said groove 23. The beveled surface allows the resilient seat 30 to be inserted not the groove 23 and in turn facilitates locking of the resilient seat 30. Once the wedge 32 is in the second end or stepped down portion 28, the locking surface 35 of the ring 30 is capable of abutting, engaging, or contacting the interior locking surface 26 of the groove 23. The locking surface 35 of the ring 30 and the locking surface 26 of the groove 23 enable the ring 30 to self or automatically secure or retain the ring 30 within the groove 23 without the need for additional retaining devices. In particular, the stepped surface 24 enables locking of the seat 30, thereby preventing the outward seat 30 movement when the gate 11 is fully closed or open, and in partially open and partially closed states as well. Further, while the locking surfaces 26 and 35 are depicted as being substantially parallel to the gate 11, seat face 43 of the metal or replaceable seat 21, (or parallel to the interior surface 13 of the valve body 20) and perpendicular to the top surface 25, it is to be appreciated that other angles of the locking surfaces 26 and 35 are possible and within the scope of this disclosure, so long as the locking surfaces 26 and 35 can engage or abut together once the wedge 32 is in the second or stepped down end 28 of the groove 23 to prevent outward movement of the plastic ring 30.

In the exemplary embodiments depicted in FIGS. 9-10, the gate engagement end 38 of the plastic or flexible seat 30 may be offset, set, or staggered at an offset distance 39 from the seat face 43, or secondary engagement face 43, of the body 20 or metal seat 21. In particular, the engagement end 38 of the resilient seat 30 extends a further distance 39 towards the gate 11 than the secondary engagement face 43 of the body 20 or metal seat 21. The seat face or secondary engagement face 43 may be radially closer or nearer to the bore axis 15 than the engagement end 38 of the plastic seat 30. The presence of the offset 39 may be used in exemplary embodiments knife gate valves 10 having uni-directional or bi-directional media flow. Further, the offset distance 39 may be, in certain exemplary embodiments, 0.5 millimeters, but can vary depending on the needs of the operation of the valve 10. The offset distance 39 ensures that the gate 11 will contact the soft seat 30 first and foremost; once the soft seat 30 wears out, the metal seat 21 (or valve body 20) will then be able to contact the gate or obturator 11. The offset 39 serves to protect the integrity of the valve 10, as the seat 30 wears out first, and is more easily replaceable than the valve body 20 or metal seat 21.

FIGS. 6-7 depict a side cross section view, and an enlarged view of same, of an alternative exemplary embodiment of a face seating knife gate valve 10 for bidirectional media flow with two resilient seats 30. In FIGS. 6-7, the alternative exemplary embodiment of the knife gate valve 10 may have two metal seats 21, and each metal seat 21 may each define a groove 23, into each which is inserted a flexible, resilient, or plastic seat or ring 30, substantially similar to the grooves 23 and seats 30 as described above for FIGS. 1-2, 4 and 8-10. However, in the exemplary embodiments of FIGS. 6-7, the groove profile 22 defines a further or additional annular pocket or compartment 41 in the rear surface 29 of the profile 22, into which an O-ring 40 may be inserted. The alternative exemplary embodiments of the bi-directional knife gate valve 10 in FIGS. 6-7 may require the plastic seats 30 to be energized and thus the optional O-rings 40 provide the necessary energization to the end 37 of the plastic or resilient seat 30.

The provided range of degrees for the angle 36*a* of the wedge 32 combined with the locking surfaces 26 and 35 enables quick and efficient installation of the flexible ring 30 into the groove 23. Further, the present embodiments allow self or automatic locking, securing, or retaining of the plastic or resilient ring 30 within the groove 23 without any need for additional retaining devices such as screws, pins, retaining rings, adhesives, welding, and the like as seen in conventional knife gate valves and is further capable of limiting outward movement of the ring 30. The plastic ring 30 can be snapped into the groove 23 and locks immediately upon insertion. Moreover, the angle 36*a* ensures smooth entry of the wedge 32 into the groove 23. Also as can be seen in FIGS. 11-14, the improved knife gate valve 10 and ring 30 are further suitable for reverse pressure (subject to backing ring 50 or gate guide/flange button 53 availability) for knife gate valves 10 having unidirectional media flow in a first direction 51, and a second or reverse direction 52, wherein the second direction 52 is opposite to the first direction 51. Unidirectional valves 10 may have preferable first flow direction 51 (i.e. wherein the seat 30 side is downstream flow). In bidirectional valves 10 there may be no preferable flow direction. Where reverse flow occurs regularly, bidirectional valves 10 may be the more suitable valve. But in some situations where the reverse pressure of the reverse direction 52 is suitably low, a unidirectional valve 10 can be utilized, via adding a back ring 50 or flange button 53 to hold the reverse pressure.

As the groove 23 is integral to the valve body 20 (or a single component of the valve body), the machining of the groove 23 can be accomplished with decreased cost. Additionally, as the flexible, plastic, or resilient seat 30 is also preferably constructed of a unitary, integral, single or one piece component, the cost of producing same is also lowered compared to conventional or known seats. Notably, certain conventional seats may require further machining of the conventional seat, including crimping or compressing steps to include additional components such as O-rings, which are not needed for the presently disclosed improved seat 30. Assembly may also be more difficult in the prior art as it may require top entry of the conventional ring; in the present disclosures, the improved ring 30 may be installed simply by raising the gate 11 and inserting the ring 30 into the exposed interior face 13. As another distinction over the prior art, the presently disclosed knife gate valve 10 also does not require the use of any O-rings for a uni-directional media flow, and thus can be suitable for higher temperature ranges over the prior art.

Moreover, the groove 23 and ring 30 are capable and sufficient for use in orientations of knife gate valves 10 having non-vertical stem orientations. As seen and described in the figures, the combination of the groove 23 and the ring 30 can be adapted for integral seating (wherein the groove 23 is defined in the valve body 20), or separate seating (wherein the groove 23 is defined in a metal seat 21 attached to the valve body), and for knife gate valves 10 having either uni-directional or bi-directional media flow.

The offset distance 39 ensures that the gate 11 will contact the soft or flexible seat 30 first and foremost; once the soft or flexible seat 30 wears out, the metal seat 21 (or valve body 20) will then be able to contact the gate or obturator 11. The offset 39 serves to protect the integrity and extend the use of the valve body 20 or metal seat 21, as the seat 30 wears out first, and is more easily replaceable than the valve body 20 or metal seat 21. In conventional known seats, the replacement of any seat may require a complicated and multi-component seat assembly and install; in the present exemplary embodiments, merely removing the prior seat 30 and snapping in a singular new seat 30 is often sufficient to return the knife gate valve 10 to working order. Accordingly, the use of the improved groove 23 and plastic, flexible, or resilient seat ring 30 overcomes many difficulties in conventional valves with regards to instability of conventional seats during cycling, including conventional seats becoming unretained, coping with reverse pressure in valve systems, cost effectiveness, ease of use and repair, and also the adding the capability of use in horizontal and other nonvertical valve orientations.

While the exemplary embodiments are described with reference to various implementations and exploitations, it will be understood that these exemplary embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A knife gate valve having a valve body which defines a bore along a bore axis for a media flow, and a gate for the bore, and comprising:

an interior surface of the valve body;

an annular groove defined entirely within the interior surface of the valve body;

a stepped surface and a first locking surface defined in and of the annular groove, wherein the first locking surface is adjacent and contiguous to the stepped surface;

a resilient seat ring inserted into the annular groove, wherein the resilient seat ring comprises a wedge defining a sloped surface, and wherein the wedge is installed past the stepped surface of the annular groove;

a second locking surface defined on the resilient seat ring, wherein the second locking surface is adjacent and contiguous to the sloped surface; and further wherein the first locking surface and second locking surface are configured to abut;

wherein the resilient seat ring further comprises a resilient seat body, and wherein the sloped surface of the wedge protrudes from the resilient seat body;

wherein the resilient seat ring comprises an engagement end for contacting the gate; and further wherein the engagement end extends an offset distance from the interior surface of the valve body towards the gate;

wherein the sloped surface is set an angle between 10 to 15 degrees;

wherein the annular groove further comprises an annular pocket and further comprising an O-ring inserted into the annular pocket; and wherein the O-ring contacts a second end of the resilient seat ring, wherein the second end is opposite the engagement end.

2. The apparatus according to claim 1, wherein the first locking surface and the second locking surface are perpendicular to the bore axis.

3. The apparatus according to claim 1, wherein the annular groove is defined entirely within a metal seat of the valve body.

4. The apparatus according to claim 1, further comprising a beveled surface defined between the interior surface of the valve body and the stepped surface of the annular groove.

* * * * *